Feb. 3, 1942.   J. P. WIBLE   2,271,671
FRACTIONAL DISTILLATION
Filed March 18, 1939
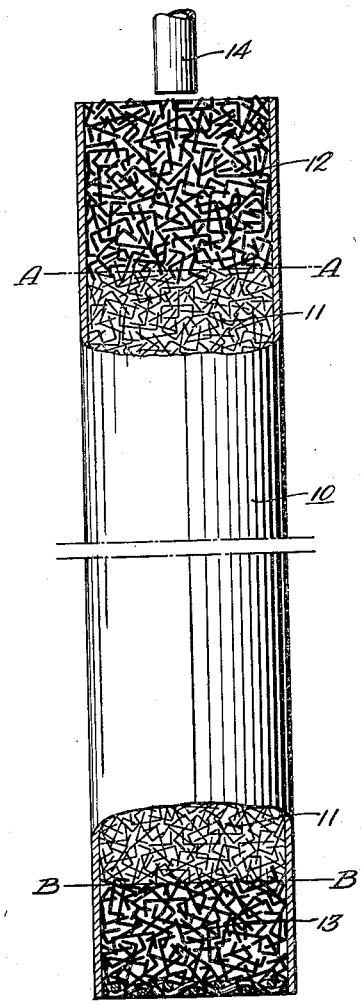
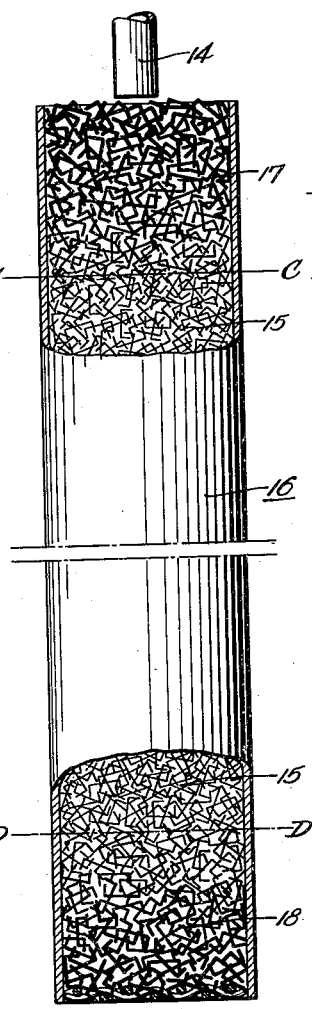
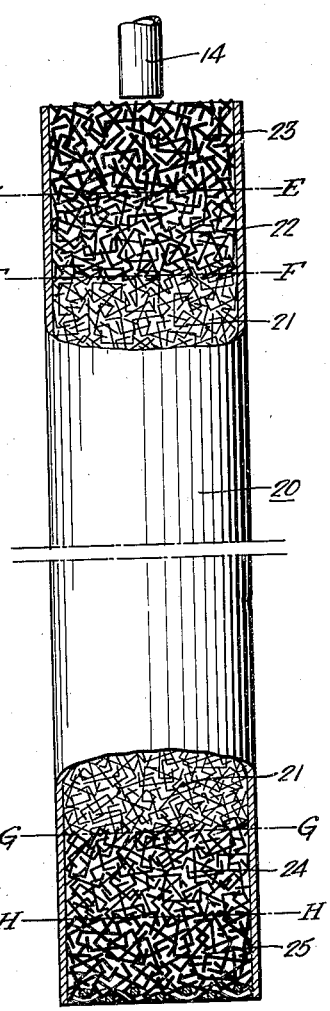
Inventor:
Joseph P. Wible
by his Attorney
Hugo A. Kenman Patented Feb. 3, 1942

2,271,671

UNITED STATES PATENT OFFICE 2,271,671

FRACTIONAL DISTILLATION

Joseph P. Wible, Philadelphia, Pa., assignor to The United Gas Improvement Company, a corporation of Pennsylvania Application March 18, 1939, Serial No. 262,647

12 Claims. (Cl. 261—94)

This invention pertains generally to the fractionation of liquid mixtures and pertains particularly to columns for this purpose.

The invention pertains more particularly to the distribution of packing material in tubular columns for the purpose of increasing capacity and efficiency.

Tubular columns either of the single tube or of the multi-tubular type are well known in the art. Such columns are characterized by being packed with phase contacting material of which raschig rings, glass beads, carpet tacks, carding teeth, jack chain, and small wire forms, are examples.

It is found that the efficiency of packed columns is to a certain extent dependent upon the vapor throughput, in that, as a general rule, highest efficiency is obtained when the throughput is increased to just below the flooding point.

I have discovered that the vapor throughput may be measurably increased beyond the normal flooding point, and that the fractionating efficiency may be increased beyond that attainable under ordinary conditions, by modifying the packing arrangement at the top or at the bottom of the individual fractionating tube.

In accordance with my invention, the vapors to be fractionated enter the bottom of the column under conditions of gradually decreasing free space down to the average free space afforded by the main body of the packing, and the rectified vapors leave the top of the column under conditions of gradually increasing free space up from the average free space afforded by the main body of the packing, or the latter may be employed without the former.

Otherwise considered, the vapor at the bottom of the column enters under conditions of gradually increasing velocity, and the vapor at the top of the column leaves under conditions of gradually decreasing velocity, or the latter may obtain without the former.

Since vapor flows out at the top after being disengaged from the liquid phase, and liquid flows out at the bottom after being disengaged from the vapor phase, it may be said that the phases are disengaged under conditions of decreasing vapor velocities.

Among the desirable results accomplished by my invention are:

(1) Greater thruput per unit of cross-sectional area for a column packed with a given material, without flooding same; and (2) Greater maximum efficiency of operation, since efficiency increases with thruput up to the flood point, almost invariably, in packed columns.

The flooding of a column is due to a local condition of vapor velocity sufficient to act upon the descending liquid film and turn it backward upon itself, causing a piling up of liquid, through which the vapor will continue to pass, causing bubbling, frothing and entrainment of liquid. The ensuing rise in differential pressure prevents further increase in thruput and the increased entrainment of liquid and excessive holdup act to cause a decrease in efficiency. This flooding may occur at any level in the column where cause exists, such as a tightly packed space or packing fouled with solid matter. However, in a clean and well packed column the levels at which initial flooding begins are at the top and/or the bottom of the packed space. In case of columns packed in sections, this applies to the top and bottom of each section.

The conditions which cause flooding at the top and at the bottom are not always exactly the same.

A first condition inducing flooding is constriction of cross-sectional area, necessitated by supports placed under the packing, or by retaining arrangements at the top to prevent packing from shifting or floating under stress. Any constriction due to either cause produces a zone of greater vapor velocity for a given column thruput.

The second condition promoting flooding at top is change in amount of liquid entrainment due to decrease in vapor velocity once the vapors leave the packing.

A third is the larger ratio of liquid to vapor phase at the top of all except perfectly adiabatic columns, due to the return liquid being somewhat below the boiling point.

The second and third conditions require that the top packing handle slightly more liquid than the packing below, with respect to a given thruput of vapor.

A fourth and most important cause of top flooding is imperfect distribution of reflux to the packing, especially fine packing. It is practically impossible to deposit the liquid on the packing in a manner such that the liquid will immediately assume the film form and distribution in which it is to pass through the packing. Until it has done so, there are necessarily areas of higher vapor velocity at any surface where there is locally an excess of liquid obstructing the vapor flow.

A cause of flooding at the bottom of sections is interference of re-distributing devices for liquid with the free flow of vapors. Such devices are necessary in columns packed in sections.

These causes lead to the same result, a flooding due to action of high velocity vapor on liquid film.

A feature of the invention is to provide a means of reducing vapor velocity, relatively, at these zones, namely, top or top and bottom, and at the same time provide at the top a means of liquid distribution to the packing which will avoid or reduce the channelling and flooding effects of imperfect distribution of liquid. Both increased thruput and improved distribution result in greater efficiency.

When my invention is employed, the column capacity may be measurably stepped up without danger of flooding and the fractionating efficiency is substantially increased in all cases where greater vapor velocity favors this condition.

Furthermore, the likelihood of entrainment of liquid in the escaping vapor is very substantially decreased.

Other features of the invention reside in the construction, arrangement and combination of parts, and in the steps, combinations of steps, and sequences of steps all of which together with other features will become more apparent to persons skilled in the art as the specification proceeds, and upon reference to the drawing in which:

Figure 1 is a sectional elevation (shown broken) of a fractionating tube having the invention applied thereto;

Figure 2 is a sectional elevation (shown broken) illustrating another form of arrangement of packing; and Figure 3 is a sectional elevation (shown broken) illustrating a still further form of arrangement of packing:

Referring now more particularly to Figure 1, at 10 is shown a tubular fractionating column which is packed over its main portion with a packing material illustrated at 11.

Packing material 11 may be of any type and may have any shape and arrangement. Furthermore, the individual elements making up the packing which, for example, in the case of jack chain comprise the individual links may be of any desired size or sizes to afford any desired degree of free space.

For convenience in description, the upper boundary of packing 11 is illustrated by line A—A, and the lower boundary of packing 11 is illustrated by line B—B, although it is to be understood that a sharp boundary line is not essential, and in fact intermingling and/or interlocking of the packing across the boundary line is found to be desirable.

Packing 12 which is disposed above packing 11 and packing 13 which is disposed below packing 11, are each composed of elements which afford greater free space than the elements which make up packing 11.

Packings 12 and 13 may be of any convenient depth but, of course, such depth should be sufficient to accomplish the desired purpose. For example, a depth of 2 inches in a tube of small cross-sectional area will, as a rule, be found satisfactory, although this may be modified to some extent by a change in character of packing, or change in diameter or geometrical cross-section of the tube, or otherwise.

The packing size or sizes which are selected to be placed above or above and below the main packing zone depends upon the size and kind of packing in the latter. In the case of very fine main packing two sizes might be used to bring about the effect. Generally only one is needed.

A tube for feeding reflux liquid into the top of the tube is diagrammatically illustrated at 14 in each of the figures of the drawing.

If desired, and in lieu of a more sharply defined layer arrangement, the packing at the top or top and bottom may gradually decrease in coarseness in the direction of the main body of the packing, such as by intermingling two or more sizes of packing in varying proportion.

This is illustrated in Figure 2 wherein the main body 15 of the packing in fractionating tube 16 is disposed between the lines C—C and D—D.

Packing 17 at the top gradually decreases in coarseness or free space down to line C—C. This may be accomplished in any desired manner, for instance, by employing a mixture of differently sized packing elements in which the smaller size or sizes predominate adjacent line C—C and gradually decrease in number up to the top where the larger size or sizes predominate.

Likewise, packing 18 at the bottom gradually decreases in coarseness or free space up to line D—D. This likewise may be accomplished in any desired manner, for instance, by having the smaller size or sizes predominate adjacent line D—D and decrease in number downwardly toward the bottom, where the larger size or sizes predominate.

Other arrangements are possible. For instance, the packing material may be arranged in layers of different degrees of coarseness or free space, each layer being either of uniform coarseness or of variable coarseness, for instance, following the principle of the preceding paragraphs.

This is illustrated in Figure 3 wherein column 20 has a main body of packing 21, the elements of which may be of any desired size or sizes.

Directly above packing 21 is a layer 22 of packing having an average coarseness or free space greater than that of packing 21.

Above layer 22 is a layer 23 of packing having an average coarseness or free space greater than that of layer 22.

Likewise, directly below packing 21 is a layer 24 of packing having an average coarseness or free space greater than that of packing 21.

Below layer 24 is a layer 25 of packing having an average coarseness or free space greater than that of layer 24.

Any desired number of such layers may be employed. It is preferred, however, to limit the combined height of the packing having greater free space as much as possible such as to less than 15% of the total height of the column.

The following example will further illustrate my invention.

*Example 1*

A column 5 ft. in height and 2 in. in diameter was packed throughout its main portion with small wire forms made from #29 wire and having overall dimensions averaging 4 mm. by 6 mm.

Above and below the main portion was disposed a mixture of the foregoing packing with a somewhat coarser packing comprising similar wire forms made from #24 wire and having overall dimensions averaging 9 mm. by 32 mm.

The height of the upper layer was 3 in. and the height of the lower layer was 2 in.

At the border lines between the main packing and the upper and lower layers the packing was intermingled or interlocked to avoid a sharp transition from one to the other.

The throughput capacity without flooding of the above column was 30% greater than the throughput capacity of a similar column of the same dimensions but without my invention applied thereto. The overall height of packing in each case was the same. The efficiency was increased by approximately 12%.

The gradual disengagement of the phases at the top or top and bottom of the individual fractionating tube or column to avoid entrainment and to increase throughput and efficiency may be accomplished in other ways.

Moreover, in any of the forms of the invention particularly described, it is not essential that the same type of packing be used throughout.

Mixtures of different types of packing may be employed either for the main body of packing or for the end packing, or both.

From the foregoing it will be seen that a fundamental feature of similarity between the various forms of the invention particularly described resides in the efficient engagement and disengagement of the liquid and vapor phases at the top or top and bottom of the fractionating tube or column such as under conditions which would normally result in entrainment, flooding, and inefficient fractionation.

Also a fundamental feature of similarity between the various forms of the invention particularly described in connection with the varitious figures of the drawing resides in reducing any tendency toward flooding by decrementally decreasing the average vapor velocity in the direction of vapor flow prior to final disengagement of the ascending vapor from the descending liquid.

Therefore, it is to be understood that the above particular description is by way of illustration and that changes, omissions, additions, substitutions and/or modifications might be made within the scope of the claims without departing from the spirit of the invention.

I claim:

1. A method for fractionating a fluid mixture in a fractionating column, comprising intimately and counter-currently contacting ascending vapors and descending liquid reflux in a fractionating zone of said column, said fractionating zone having phase contacting means with a predetermined average free space, and disengaging said ascending vapors and said descending liquid reflux in a phase disengaging zone adjoining the top of said fractionating zone, said phase disengaging zone having phase contacting means with an average free space greater than that of said fractionating zone.

2. A method for fractionating a fluid mixture in a fractionating column, comprising intimately and counter-currently contacting with a desired average vapor velocity ascending vapors and descending liquid reflux in a fractionating zone of said column, and disengaging said ascending vapors and said descending liquid reflux in a phase disengaging zone adjoining the top of said fractionating zone under conditions of decrementally decreasing average vapor velocity upwardly from said fractionating zone.

3. A method for fractionating a fluid mixture in a fractionating column to increase the fractionating efficiency and throughput, comprising intimately and counter-currently contacting ascending vapors and descending liquid reflux in a fractionating zone of said column under conditions of vapor velocity normally causing flooding, and disengaging said ascending vapors and said descending liquid reflux in a phase disengaging zone adjoining the top of said fractionating zone under conditions of decrementally decreasing vapor velocity upwardly from said fractionating zone.

4. A method for fractionating a fluid mixture in a packed fractionating column to increase the fractionating efficiency and throughput, comprising intimately and counter-currently contacting ascending vapors and descending liquid reflux in a packed section of said column under conditions of vapor velocity normally causing flooding, the packing of said section having a predetermined average free space, disengaging said ascending vapors and said descending liquid reflux at the bottom of said section in packing of greater average free space than said first mentioned packing, and disengaging said ascending vapors and said descending liquid reflux at the top of said section in packing of greater average free space than said first mentioned packing.

5. Apparatus comprising a fractionating column, phase contacting means in said column, said phase contacting means having a predetermined average free space throughout the main portion thereof and having a top portion with an average free space greater than that of said main portion, means for delivering vapors to said column for upward flow through said main portion and then through said top portion, and means for delivering liquid to said column for downward flow through said top portion and then through said main portion.

6. Apparatus comprising a fractionating column, phase contacting means in said column, said phase contacting means having a main portion of predetermined average free space and top and bottom portions in which the average free space is greater than that of said main portion, means for delivering vapors to said column for upward flow through said bottom portion then through said main portion and then through said top portion, and means for delivering liquid to said column for downward flow through said top portion then through said main portion and then through said bottom portion.

7. Apparatus comprising a fractionating column, packing in said fractionating column for the contact of counter-currently flowing fluid phases, said packing being divided into a main portion and a top portion, said main portion having a predetermined average free space, and said top portion arranged in a layer of greater average free space than said main portion, means for delivering vapors to said column for upward flow through said main portion and then through said top portion, and means for delivering liquid to said column for downward flow through said top portion and then through said main portion.

8. Apparatus comprising a fractionating column, packing in said fractionating column for the contact of counter-currently flowing fluid phases, said packing being divided into a main portion and top and bottom portions, said main portion having a predetermined average free space, and said top and bottom portions each having a layer formation of greater average free space than said main portion, means for delivering vapors to said column for upward flow through said bottom portion then through said main portion and then through said top portion, and means for delivering liquid to said column for downward flow through said top portion then through said main portion and then through said bottom portion.

9. Apparatus comprising a fractionating column, packing in said fractionating column for the contact of counter-currently flowing fluid phases, said packing being divided into a main portion and a top portion, said main portion having a predetermined average free space, and said top portion arranged in a plurality of layers each of greater average free space than said main portion and with the average free space of each succeeding layer being greater than the average free space of the preceding layer in the direction upwardly from said main portion, means for delivering vapors to said column for upward flow through said main portion and then through said top portion, and means for delivering liquid to said column for downward flow through said top portion and then through said main portion.

10. A method for fractionating a fluid mixture containing components of different volatilities to reduce flooding and to increase fractionating efficiency, comprising intimately and counter-currently contacting ascending vapor and descending liquid for purposes of fractionation with the average vapor velocity sufficiently high to normally cause at least incipient flooding, and avoiding said flooding by decrementally decreasing said vapor velocity in the direction of vapor flow at the upper end of said counter-current contact of ascending vapor and descending liquid, said decremental decrease taking place prior to final disengagement of said vapor from said liquid.

11. A method for fractionating a fluid mixture containing components of different volatilities to reduce any tendency toward flooding, comprising intimately and counter-currently contacting ascending vapor and descending liquid for purposes of fractionation, and reducing any tendency toward flooding by decrementally decreasing the average vapor velocity in the direction of vapor flow at the upper end of said counter-current contact of ascending vapor and descending liquid, said decremental decrease taking place prior to final disengagement of said vapor from said liquid.

12. Apparatus comprising a fractionating column, packing in said fractionating column for the contact of counter-currently flowing fluid phases, said packing being divided into a main portion and a top portion, said main portion having a predetermined average free space, and said top portion gradually increasing in average free space upwardly from said main portion, means for delivering vapors to said column for upward flow through said main portion and then through said top portion, and means for delivering liquid to said column for downward flow through said top portion and then through said main portion.

JOSEPH P. WIBLE.